United States Patent
Sheridan (10) Patent No.: US 9,321,150 B2
(45) Date of Patent: Apr. 26, 2016

(54) AGGREGATE ABRASIVES FOR ABRADING OR CUTTING TOOLS PRODUCTION

(76) Inventor: Cedric Sheridan, Dondelange (LU)

( * ) Notice: Subject to any disclaimer, the term of this patent is extended or adjusted under 35 U.S.C. 154(b) by 211 days.

(21) Appl. No.: 13/636,174

(22) PCT Filed: Mar. 22, 2011

(86) PCT No.: PCT/EP2011/054357
§ 371 (c)(1),
(2), (4) Date: Sep. 20, 2012

(87) PCT Pub. No.: WO2011/117244
PCT Pub. Date: Sep. 29, 2011

(65) Prior Publication Data
US 2013/0008092 A1 Jan. 10, 2013

(30) Foreign Application Priority Data
Mar. 23, 2010 (EP) .................................... 10157364

(51) Int. Cl.
| | | |
|---|---|---|
| *B24D 18/00* | (2006.01) | |
| *B24D 3/06* | (2006.01) | |
| *B24D 99/00* | (2010.01) | |

(Continued)

(52) U.S. Cl.
CPC *B24D 18/00* (2013.01); *B24D 3/06* (2013.01); *B24D 99/005* (2013.01); *C09K 3/1436* (2013.01); *C22C 26/00* (2013.01); *B22F 2005/001* (2013.01)

(58) Field of Classification Search
CPC ............ C09K 3/14; B24D 3/06; B24D 18/00; B24D 99/00
USPC .......................................................... 51/307
See application file for complete search history.

(56) References Cited

U.S. PATENT DOCUMENTS

| | | | |
|---|---|---|---|
| 3,779,726 A | 12/1973 | Fisk et al. | |
| 4,311,489 A * | 1/1982 | Kressner ............. | C09K 3/1436 51/295 |

(Continued)

FOREIGN PATENT DOCUMENTS

| | | |
|---|---|---|
| WO | 9527596 A1 | 10/1995 |
| WO | 2008025836 A1 | 3/2008 |

(Continued)

OTHER PUBLICATIONS

Mowital Technical Data Sheet; "Kuraray" Aug. 2013 http://www.kuraray.us.com/wp-content/uploads/2013/09/MOWITAL-TDS.pdf.*

(Continued)

*Primary Examiner* — Kaj K Olsen
*Assistant Examiner* — Alexandra M Moore
(74) *Attorney, Agent, or Firm* — Cantor Colburn LLP (57) ABSTRACT

Aggregate abrasive grains for use in the production of abrading or cutting tools are formed such that each grain includes an abrasive core particle and a plurality of abrasive peripheral particles disposed around the core particle. The abrasive particles intended as the core particles are provided with a coating containing a binder. These binder-coated core particles are then surrounded with those particles that are intended to become the peripheral particles of the aggregate grains. The binder-coated core particles surrounded with the peripheral particles are heated to a temperature at which the binder softens so that the peripheral particles attach to the core particles.

26 Claims, 2 Drawing Sheets

(51) Int. Cl.
*C09K 3/14* (2006.01)
*C22C 26/00* (2006.01)
*B22F 5/00* (2006.01)

(56) References Cited

U.S. PATENT DOCUMENTS

| | | | |
|---|---|---|---|
| 4,364,746 A * | 12/1982 | Bitzer | C09K 3/1436 51/296 |
| 4,770,907 A | 9/1988 | Kimura | |
| 5,039,311 A * | 8/1991 | Bloecher | B24D 3/38 51/295 |
| 6,797,023 B2 * | 9/2004 | Knapp | B24D 3/04 428/323 |
| 7,044,989 B2 * | 5/2006 | Welygan | B24D 3/002 51/293 |
| 7,077,723 B2 * | 7/2006 | Bright et al. | 451/28 |
| 7,399,330 B2 * | 7/2008 | Schwabel | B24D 3/16 427/180 |
| 2006/0213128 A1 | 9/2006 | Sung | |
| 2008/0017421 A1 | 1/2008 | Lockwood | |

FOREIGN PATENT DOCUMENTS

| | | |
|---|---|---|
| WO | 2008025838 A1 | 3/2008 |
| WO | 2009118381 A2 | 10/2009 |

OTHER PUBLICATIONS

International Search Report; International Application No. PCT/EP2011/054357; International Application Filing Date Mar. 23, 2011; Mail date May 11, 2011.

Written Opinion; International Application No. PCT/EP2011/054357; International Application Filing Date Mar. 23, 2011; Mail date May 11, 2011.

* cited by examiner

AGGREGATE ABRASIVES FOR ABRADING OR CUTTING TOOLS PRODUCTION

TECHNICAL FIELD

The present invention generally relates to a method of forming an aggregate abrasive grain for use in the production of abrading or cutting tools. In the following, "aggregate abrasive grain" or "aggregate particle" etc. designates an abrasive or superabrasive particle ("core particle"), which further abrasive or superabrasive particles ("peripheral particles") are attached to by chemical bonds or mechanically. Such aggregate grains are useful, in particular, for facilitating the production of abrading or cutting tools, e.g. drill bits, inserts or cutting elements for drill bits, etc. as well as for improving the quality of such tools.

BACKGROUND ART

Tools for cutting and/or abrading are conventionally fabricated of a suitable matrix material with minute abrasive grains, such as diamonds, embedded within the matrix material. Basically, such tools are formed by conventional powder metallurgical techniques, wherein the abrasive grains are initially mixed with the matrix material (e.g. metals, alloys, metal carbides etc., as well as mixtures thereof) in powder form and some binding agent, after which the mixture is press-moulded to bond and bring the mixture into the desired tool shape. In the so-called hot-pressing method, the mixture is placed in a mould having the shape of the abrasive tool to be formed and pressed at high pressure and temperature to cause sintering of the sinterable material. According to the "cold press and sinter" technique, the mixture is first pressed at high pressure into the desired tool shape and thereafter fired at high temperature in a furnace to sinter the tool. As an alternative to these compaction techniques, it is known, for instance from document EP 0 754 106 B1, to provide soft and easily deformable preforms in the form of a slurry or paste containing the matrix material in powder form, abrasive grains and some liquid binder phase. The soft and easily deformable preforms are subsequently sintered and/or infiltrated. Tools fabricated in these or similar manners are commonly referred to as metal-bonded abrading or cutting tools.

Efficiency and lifetime of an abrading or cutting tool are among others determined by the degree of uniformity of the distribution of the abrasive grains on the surface or volume of the tool and by the retention strength of the abrasive grains within the surrounding matrix material. In tools fabricated according to any of the above-described techniques, the abrasive grains are randomly distributed, which means that some of them may be close to each other, possibly touching each other, while some regions of the tool may only have little density of abrasive grains. As a matter of fact, this negatively affects the cutting or abrading performance of the tool.

An important step towards uniform distribution of abrasive particles throughout the matrix material was the method taught in U.S. Pat. No. 3,779,726. This document proposes to tumble the abrasive grains in the presence of a powder of sinterable material and binding agent while controlled amounts of water are simultaneously sprayed thereon. In this way, each abrasive particle is singularly coated with a sinterable particulate mass in such a way that granules, so-called "pellets", are formed. These pellets are subsequently pressed into the desired shape at high pressure (35 tons per square inch, i.e. approximately 500 MPa), possibly after being mixed with granulated metal powder. Those skilled in the art are aware that mixing the pellets with metal powder may cause the problem of segregation between the metal powder and the pellets. Another method for individually coating abrasive grains is disclosed in U.S. Pat. No. 4,770,907. This method commences with the preparation of a slurry of a selected metal powder with a binding agent dissolved in an organic solvent in predetermined relative concentrations. The abrasive grain cores are then fluidized in a work vessel and the slurry is sprayed onto the abrasive grains cores during fluidization, whereby a generally uniform coating of the slurry builds and dries on each abrasive grain. A further improvement in terms of particle distribution has been reached with the method of WO 2008/025838 A1, according to which a soft, easily deformable paste is formed which has superabrasive particles dispersed therein, each of these particles being individually encrusted within a coating of presintered material. The presintered coating keeps the superabrasive particles at least at a distance of twice the thickness of the coatings from one another. These coatings also prevent a direct contact between the superabrasives and the mould or the walls of an extrusion/injection moulding system.

US patent application 2008/0017421 A1 discloses encapsulated particles, whose encapsulation ("shell") comprises sinterable matrix material and abrasive particles. The composition of the matrix as well as type, size and density of the abrasive particles in the shell can be selected depending on the specifications for the abrading or cutting tool. To produce individually encapsulated particles having similar amounts of shell material and approximately the same size, US 2008/0017421 A1 suggests mixing the particles to be encapsulated, matrix powder and the abrasive particles for the shell in a conventional mixing machine and processing the resulting mix with a granulator, in which the mix is extruded into short "sausage" shapes, which are then rolled into balls (granules) and dried. As an alternative, the document proposes the using the so-called Fuji-Paudal pelletizing machine, disclosed e.g. in U.S. Pat. No. 4,770,907. As regards the "sausage" method, the granules that are formed are not uniform so that a step of selecting granules of substantially the same size is requires. This method has the further drawbacks that each granule formed does not necessarily contain one (and only one) core particle and that the core particle is not necessarily positioned centrally within its shell. Thus 2008/0017421 A1 does not enable the production of pellets having a single abrasive particle in the centre.

Neither U.S. Pat. No. 4,770,907 nor U.S. Pat. No. 3,779,726 disclose methods allowing coating core particles with shell particles whose size approaches the size of the core particles: the ratio of the average diameter of the shell particles to the average diameter of the core particles should not exceed 1/7. Nevertheless, one already encounters serious problems with the above methods as the ratio exceeds 1/11. Another problem arises if the abrasive particles to be coated and the particles used as the surrounding material exhibit very different densities (e.g. diamond: 3.5 g/cm$^3$, coarse WC: 15.8 g/cm$^3$, fused WC: 16.4 g/cm$^3$) because the particles tend to segregate. The difficulties caused by density differences are particularly pronounced in the Fuji-Paudal method. The quality of the results achieved furthermore depends on the shape of the particles involved.

International patent application WO 2009/118381 proposes a method and an apparatus for producing aggregate abrasive grains, wherein the diameter of the peripheral particles can be closer to the diameter of the core particles. According to this document, abrasive core particles are coated with adhesive, the adhesive comprising a binding agent and a solvent therefore. The adhesive-coated core particles are dropped onto a layer of abrasive particles (which are to become the peripheral particles of the aggregate abrasive grains) and covered with further peripheral particles. The aggregates so obtained are then consolidated by causing the solvent to evaporate, i.e. by letting the adhesive set. WO 2009/118381 further discloses aggregate particles with a central diamond surrounded by a plurality of smaller peripheral diamonds, which are attached to the core diamond with diamond-diamond bonds.

BRIEF SUMMARY

The disclosure improves the production of aggregate abrasive grains.

It should be noted that whenever reference is made herein to size or diameter of particles, this shall be understood as "average size" or "average diameter", determined e.g. by sieving. As is common practice in the field of abrasive particles, we will indicate particle size or diameter as a range of mesh sizes (using ASTM standard), e.g. −20/+30 mesh (which corresponds to particles diameters from about 600 to about 850 μm). It shall also be noted that the use of the term diameter is not meant to imply any specific particle shape (unless otherwise specified).

The invention proposes a method of forming aggregate abrasive grains suitable for use in the production of abrading or cutting tools, such as e.g. cutting segments, drill bits, drill bit inserts, PCD tablets, etc. Each of the aggregate abrasive grains comprises a (single) abrasive core particle and a plurality of abrasive peripheral particles disposed around the core particle. According to the method, the abrasive particles intended as the core particles are provided with a coating containing a binder (preferably having a melting temperature below the temperature up to which the core particles may be heated without deterioration thereof). The so-obtained binder-coated core particles are then surrounded with those particles that are intended to become the peripheral particles of the aggregate grains. The binder-coated core particles surrounded with the peripheral particles are heated up to a temperature at which the binder softens so that the peripheral particles are caused to attach to the core particles. After cooling, the so-obtained "green" aggregate particles may be used further, e.g. subject to a coating with a particulate mass, or to sintering or brazing.

Preferably, the core particles are provided with their binder-containing coating by dropping the core particles onto a binder in powder form after being brought to a temperature above the melting temperature of the binder. The heat of the core particles causes binder that gets into contact with the core particles to melt and to form a coating around the core particles. In this case, the binder-containing coating that is applied to the core particles essentially comprises binder.

Alternatively, the binder-containing coating may be applied on the core particles as a shell of sinterable particulate mass containing the binder as one of several components. Apart from the binder, the sinterable particulate mass may further comprise e.g. metalloid or metal particles (e.g. Cu, Co, bronze or other alloy particles), carbide particles (e.g. tungsten carbide or silicon carbide particles), etc. Such shell of sinterable particulate mass may e.g. be applied on the core particles by a method as disclosed in WO 2008/025838 A1 or WO 2008/025836 A1.

Preferably, the binder-containing coating is free or at least essentially free of solvent for the binder when the binder-coated core particles are surrounded with the peripheral particles. If a solvent for the binder is used to form the sinterable particulate shell around the core particles, the solvent for the binder is thus preferably caused to evaporate (e.g. by heating) before the binder-coated core particles are surrounded with the peripheral particles.

The present method does not require, for the attachment of the peripheral particles, a mixing or fluidizing step, during which the aggregate particles would be subjected to relatively strong mechanical forces eventually causing the disintegration of the aggregate particles before the peripheral particles are sufficiently well attached to the core particles. In contrast, it is preferable to avoid as much as possible, during the execution of the method, any shearing forces between the core particles and the peripheral particles.

In principle, the core particles may have diameters up to a few millimeters (and this is not even a strict limitation). Preferably, the core particles range in size from 14 mesh to 60 mesh (always ASTM standard). The peripheral particles preferably range in size from 16 mesh to 400 mesh (more preferably from 25 mesh to 400 mesh). Advantageously, the peripheral particles are smaller in size than the core particles. Nevertheless, the size of the peripheral particles could also amounting up to the size of the core particles. The method is also substantially insensitive to the shape of the particles.

The core particles are preferably of substantially uniform size. Similarly, the peripheral particles are of substantially uniform size. In the context of this invention, when reference is made to particles of substantially uniform size, this is intended to mean that these particles belong to the same (single or double) class according to FEPA standard. The "narrow" or "single" classes correspond to −14/+16 mesh, −16/+18 mesh, −18/+20 mesh, −20/+25 mesh, −25/+30 mesh, −30/+35 mesh, −35/+40 mesh, −40/+50 mesh, −50/+60 mesh, −60/+70 mesh, −70/+80 mesh, −80/+100 mesh, −100/+120 mesh, −120/+140 mesh, −140/+170 mesh, −170/+200 mesh, −200/+230 mesh, −230/+270 mesh, −270/+325 mesh and −325/+400 mesh. The "wide" or "double" classes correspond to −16/+20 mesh, −20/+30 mesh, −30/+40 mesh, −40/+50 mesh, etc. The core diamonds may e.g. belong to one single or double class and the peripheral diamonds to one single class.

Preferably, the binder-coated core particles surrounded with the peripheral particles are subjected to (moderate) pressure during the heating or after the heating while the binder is still soft. The peripheral particles are thus pushed into the binder that surrounds the core particles, which improves their attachment to the latter.

The binder is preferably an organic (i.e. a carbon compound) binder. It preferably comprises a thermoplastic (such as e.g. polyvinyl butyral or polycarbonate), a synthetic resin and/or paraffin. The binder is preferably chosen such that its melting temperature lies well below the temperature up to which the core particles may be heated without deterioration. Preferably, the melting temperature of the binder lies above room temperature (about 20° C.) but below 200° C., more preferably below 150° and still more preferably below 100° C.

Various kinds of abrasive particles may be used as core particles, e.g. superabrasive particles such as natural or synthetic diamonds, CVD-coated diamonds, polycrystalline diamonds, boron nitride particles, boron carbide particles, etc. or "normal" abrasive particles such as tungsten carbide (WC) particles, tungsten (W) particles, sintered tungsten carbide/cobalt (WC—Co) particles, cast tungsten carbide particles, etc. or abrasive particles comprising any combination of such materials. The core particles can also be aggregate particles, e.g. superabrasives individually surrounded with a coating of sinterable particulate mass or encrusted within a coating of presintered material, such as those disclosed in WO 2008/025838 A1 or WO 2008/025836 A1. Using abrasive particles having a coating comprising sinterable or presintered material as the core particles has the advantage that the innermost abrasive particles do not come into direct contact with the peripheral particles.

The kinds of particles usable for the core particles may also be used for the peripheral particles, where the core particles and the peripheral particles may be of the same or different kind. If the peripheral particles comprise each an abrasive particle, which for the intended application should not be in contact with one another, one may use individually encrusted or aggregate particles as the peripheral particles. The coating of such peripheral particle then prevents that their abrasive cores get into contact with one another.

The step of surrounding the binder-coated core particles with the peripheral particles preferably comprises placing or dropping the binder-coated core particles on a layer of the peripheral particles and covering the placed or dropped binder-coated core particles with further peripheral particles. Most preferably, the placed or dropped binder-coated core particles are wetted with a liquid (e.g. by spraying) prior to covering them with further peripheral particles. The liquid could be water or a solvent for the binder (e.g. methanol, ethanol, acetone, etc., depending on the binder used). The liquid could also be a colloid. The primary benefit of wetting the binder-coated core particles is that they become fixed relative to the surrounding peripheral particles, which significantly reduces segregation (which may occur due to vibrations or to possible differences in density between the core particles and the peripheral particles) of the typically larger core particles from the peripheral particles.

Depending on the type of binder powder, the height of the layer of binder powder, the momentum of the core particles when they fall into the binder powder, etc., the dropped core particles are either completely submerged by the binder powder or they remain at the surface thereof. In the latter case, the core particles are preferably covered with binder powder immediately after the dropping in order to ascertain that the core particles are completely coated with binder.

According to a preferred embodiment of the method, the core particles and the peripheral particles are diamond particles (natural or synthetic ones, possibly CVD-coated, mono- or polycrystalline) and the green aggregate particles are (preferably individually) surrounded with a sinterable particulate mass comprising carbonaceous particles, such as e.g. nanodiamonds (possibly of detonation origin), graphite, coal, coke, charcoal particles, fullerenes etc. As used herein, the term "nanodiamonds" designates diamonds having sizes smaller than 100 nm, preferably smaller than 50 nm and still more preferably smaller than 10 nm. Surrounding the aggregate particles with sinterable particulate mass is preferably achieved according to the method disclosed in WO 2008/025836. The sinterable particulate mass may comprise metal or metalloid particles, preferably of a metalloid or metal having chemical affinity for carbon, such as e.g. Si, Ti, Cr, V, Mn, Co etc. After the green aggregate particles have been surrounded with the sinterable particulate mass, they may be subjected to a high-temperature treatment. Preferably, they are subjected to a high-pressure high-temperature treatment (HPHT treatment). Typically, in such HPHT process, the pressure ranges from about 4 to about 10 GPa and the temperature from about 1000 to about 2000° C.

The method has been carried out with diamonds (of different sizes) as the core particles and as the peripheral particles. These aggregate particles were individually surrounded with a sinterable particulate mass comprising carbonaceous and Si particles. The aggregate particles surrounded with the sinterable particulate mass were then subjected to an HPHT treatment, so that the Si particles melted and formed a SiC and Si matrix in which the core and peripheral diamonds were anchored through SiC bonds. The granules thus formed turned out to be stable up to a temperature of 1200° C. and extremely resistant to erosion.

An interesting aspect of the present invention thus concerns an aggregate abrasive particle comprising a core diamond surrounded by a plurality of peripheral diamonds attached to the core diamond by a shell of matrix material, wherein the matrix material comprises SiC and/or Si particles and wherein the core diamond and the peripheral diamonds are anchored in the matrix material through SiC bonds. Such aggregate abrasive particles may e.g. be used in an abrading or cutting element, such as e.g. an abrading or cutting insert, a drill bit, a cutting segment etc.

BRIEF DESCRIPTION OF THE DRAWINGS

Further details and advantages of the present invention will be apparent from the following detailed description of not limiting embodiments with reference to the attached drawings, wherein.

DESCRIPTION OF PREFERRED EMBODIMENTS

Figure 1:
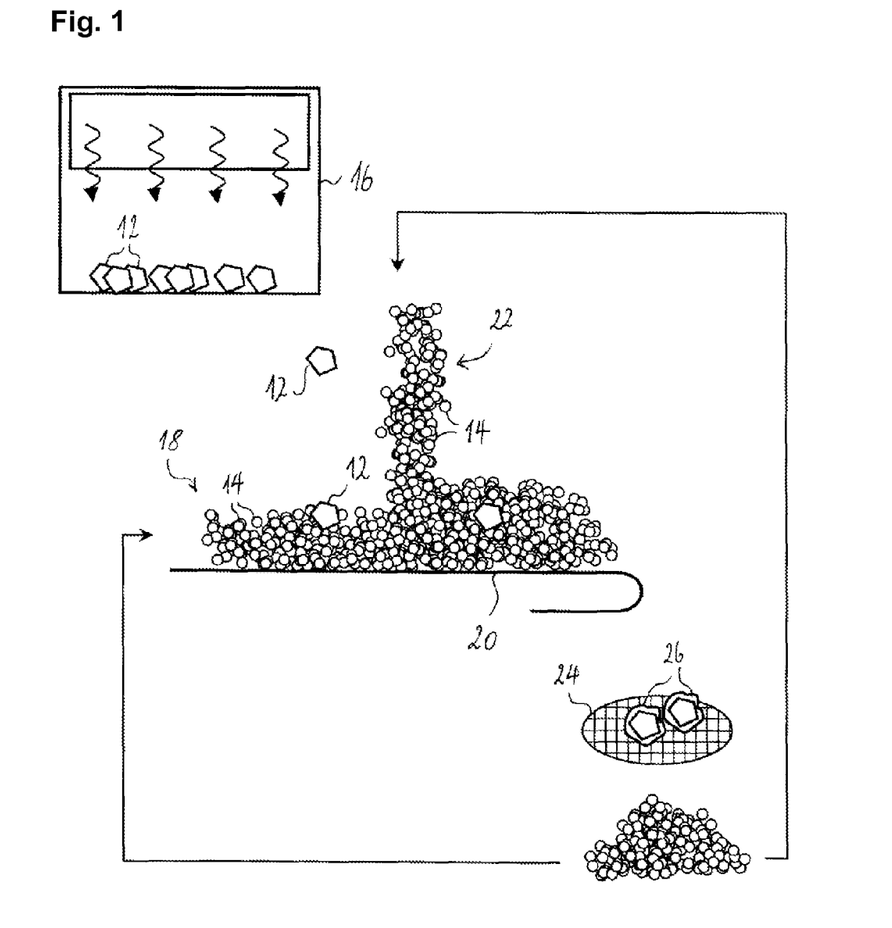
FIG. 1 is a schematic illustrating the coating of the core particles with binder.
Figure 2:
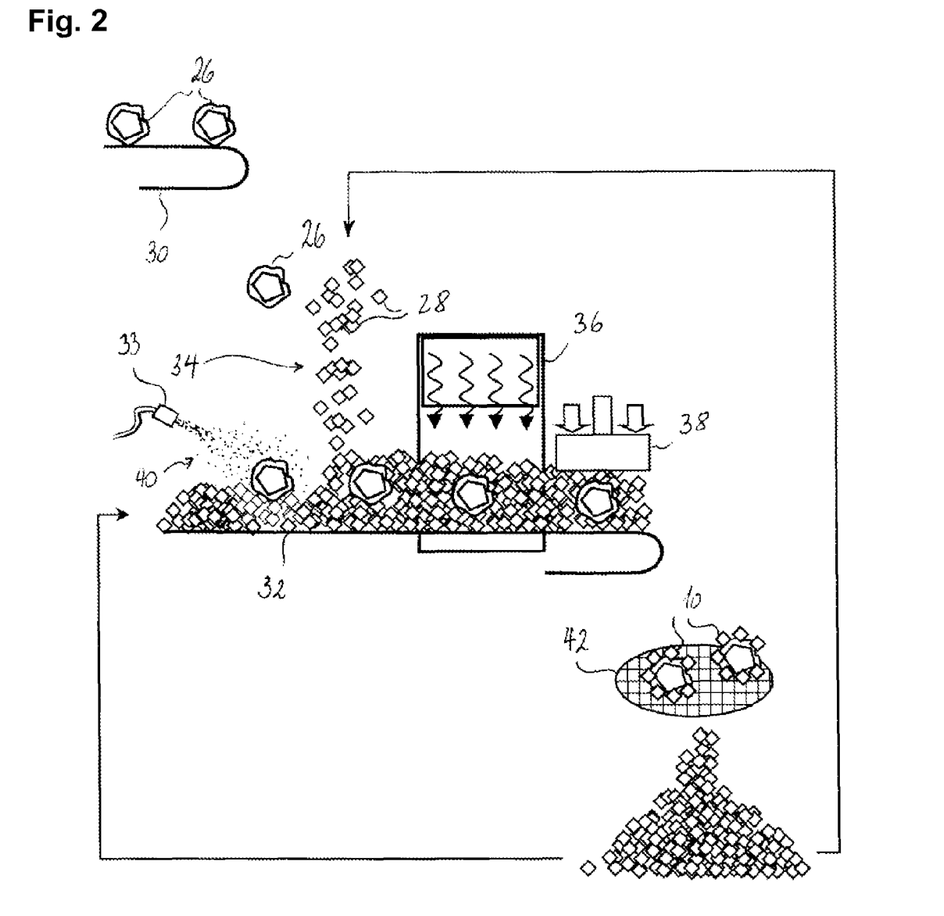
FIG. 2 is a schematic illustrating how the peripheral particles are caused to adhere to the binder-coated core particles.

FIGS. 1 and 2 illustrate the formation of aggregate abrasive grains 10 according to a preferred embodiment of the inventive method. First, particles intended to become the core particles 12 of the aggregate abrasive grains 10 are provided. These core particles 12 are preferably superabrasive particles, such as natural or synthetic diamonds, CVD-coated diamonds, polycrystalline diamonds, boron nitride particles or the like. Alternatively, abrasive particles such as tungsten carbide (WC) particles, tungsten (W) particles, sintered tungsten carbide/cobalt (WC—Co) particles, cast tungsten carbide particles, and like particles may be selected as the core particles. The core particles may also be superabrasive particles encrusted within a coating of presintered material or surrounded by a shell of sinterable particulate mass. For the production of such particles, reference is made to WO 2008/025836 A1 and WO 2008/025838 A1. The core particles 12 (including their possible coatings) are preferably of substantially uniform size between 14 mesh and 60 mesh, e.g. −20/+30 mesh, −20/+25 mesh, −25/+35 mesh, −30/+40 mesh, −40/+50 mesh, etc).

FIG. 1 illustrates how the core particles 12 are coated with binder 14. To achieve this, the core particles 12 are heated up to a temperature (e.g. from 100 to 250° C.) above the melting temperature of the binder 14 in an oven 16 (or by any other suitable means, e.g. under IR light, or by irradiation with microwaves). The hot core particles 12 are then separately dropped (e.g. from an also heated vibrating table) into a layer 18 of binder powder 14, which is moved forward on a conveyor belt 20. If, as shown in the drawing, the dropped core particles 12 are not completely submerged by the binder powder 14, they are covered with binder powder immediately after the dropping in order to ascertain that the core particles are completely surrounded with binder. This is achieved by moving the layer of binder powder 18 and the dropped core particles across a curtain 22 of binder powder 14.

The heat of the core particles 12 causes binder particles 14 that are in contact with the core particles 12 to melt (at least partially) and to adhere thereon, thus forming a coating of binder covering the surface of the core particles 12. The binder particles are chosen so as to be solid at room temperature (20° C.) but having a relatively low melting point. Suitable binder powders are powders of thermoplastic polymers, e.g. polyvinyl butyral (e.g. Mowital™ B16H or B30H polyvinyl butyral), polycarbonate, co-polycarbonate (e.g. poly (alkylene carbonate) copolymer available e.g. as QPAC™ Poly(Akylene Carbonate) Copolymer), synthetic resins, and paraffins.

The binder-coated core particles 26 are then separated from the excess binder using a sieve, the mesh size of which is chosen between the diameter of the binder particles 12 and the diameter of the core particles 14. It follows that the particle size of the binder powder is preferably chosen significantly lower than the particle size of the core particles 12 in order to enable the removal of excess binder powder simply by sieving. Recovered excess binder powder is fed back to the process.

FIG. 2 illustrates how the binder-coated core particles 26 and the particles intended to become the peripheral particles 28 are assembled. First, the binder-coated core particles 26 are surrounded with peripheral abrasive particles. To this end, the binder-coated core particles 26 are separately dropped from a conveyor belt 30 (or from a vibrating table) into a layer of peripheral particles 28. The layer of peripheral particles 28 is itself moved forward on a conveyor belt 32. The dropped binder-coated core particles 26 are passed across a curtain 34 of peripheral particles 28 in order to completely surround the binder-coated core particles 26.

In order to avoid segregation of the binder-coated core particles 26 and the peripheral particles 28, a spraying nozzle 33 sprays a liquid 40 on the binder-coated core particles 26 once they have been dropped on the layer of peripheral particles 28. The sprayed liquid 40 may e.g. be water. It could also be or comprise a solvent for the binder surrounding the core particles (typically an alcohol like methanol or ethanol, or acetone or the like, depending on the binder). Wetting the binder-coated core particles 26 and the peripheral particles 28 makes them adhere to one another sufficiently to prevent segregation (caused by vibrations of the conveyor belt 32) while they have not been attached to one another in a more permanent manner.

The binder-coated core particles 26 and the surrounding peripheral particles 28 are then heated up to a temperature at which the binder softens. This step may be effected by making the conveyor belt 32 pass through a tunnel oven 36. Alternatively the binder-coated core particles 26 and the surrounding peripheral particles 28 could be collected in a recipient and put into a separate oven. Shortly after the heating, the particles are subjected to moderate pressure (e.g. about 50-300 kg/cm$^2$) so as to push the peripheral particles into the still soft binder layer that surrounds the core particles. In FIG. 2, this is schematically illustrated at press 38. It should be noted that the temperature in oven 36 has to be carefully controlled in order to avoid that the binder liquefies and spreads into the interstices between the surrounding peripheral particles by capillarity.

The particles are then let cool down, so that peripheral particles that have be pushed into the binder coating of the core particles are trapped and remain attached to the core particle. The so-obtained aggregate particles 10 ("green" aggregate particles, because still unfired) are separated from the excess peripheral particles using sieve 42. Excess peripheral particles are reused in the process.

Figure 3:
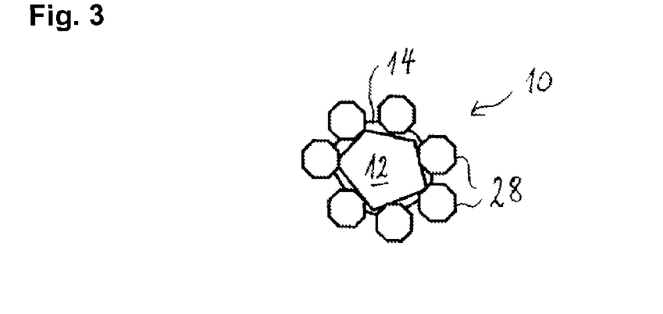
FIG. 3 is a schematic illustration of an aggregate particle obtainable according to the method of FIGS. 1 and 2.

FIG. 3 is a schematic of a spiky aggregate particle 10 obtained from the process of FIGS. 1 and 2.

Preferably, the peripheral particles 28 are of substantially uniform size between 30 mesh and 400 mesh, e.g. −60/+80 mesh, −80/+120 mesh, −100/+170 mesh, −120/+200 mesh, −140/+230 mesh −170/+325 mesh, −230/+400 mesh, −325/+400 mesh, etc. To surround the core particles with peripheral particles as uniformly as possible, the peripheral particles should have an inferior diameter compared to the diameter of the core particles. The peripheral particles may be superabrasive particles, such as natural or synthetic diamonds, CVD-coated diamonds, polycrystalline diamonds, boron nitride particles or the like. Alternatively, abrasive particles such as tungsten carbide (WC) particles, tungsten (W) particles, sintered tungsten carbide/cobalt (WC—Co) particles, cast tungsten carbide particles, and like particles may be selected as the peripheral particles. The peripheral particles may also be superabrasive particles encrusted within a coating of presintered material or covered with shell of sinterable particulate matter. For the production of such particles, reference is made again to WO 2008/025836 A1 and WO 2008/025838 A1.

The so-obtained "green" aggregate particles 10 may be pressed, together with matrix material (such as e.g. particles of WC, $W_2C$, brass, bronze, Ni, Fe, Co, Cu, CuMn, CuTi, or mixtures of these materials) into a desired tool shape and thereafter fired at high temperature in a furnace to sinter the tool. Alternatively, the mixture mixture of aggregate particles 10 and matrix material is placed in a mould having the shape of the abrasive tool to be formed and pressed at high pressure and high temperature to cause sintering of the sinterable material. This option is considered particularly useful if the peripheral particles are of sinterable material, e.g. cobalt, nickel or bronze, which strongly bonds to the surrounding matrix material.

Figure 4:
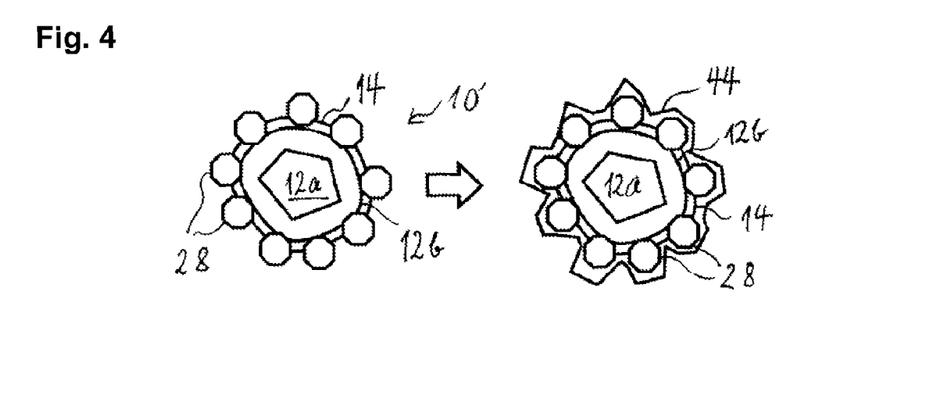
FIG. 4 is an illustration how an aggregate particle may be further coated.

Alternatively, the "green" aggregate particles 10 may be surrounded with a sinterable particulate mass comprising particles of sinterable material. FIG. 4 shows an aggregate particle 10' the core particle of which is composed of a superabrasive particle 12a encrusted within a coating 12b of presintered material. Surrounding aggregate particles 10 or 10' with sinterable particulate mass is preferably achieved according to the method disclosed in WO 2008/025836 or WO 2008/025838 A1. The outer crust 44 preferably contains particles which chemically/metallurgically bond to the presintered coating 12b and/or the peripheral particles 28 (e.g. CuMn and CuTi in case of diamond particles).

EXAMPLE 1

Aggregate abrasive grains were formed according to the method described above using diamond particles (300 ct of MBS 960, −40/+50 mesh) as core particles and silicon carbide particles with diameters from 75 to 106 μm as peripheral particles. The diamonds were heated in a standard oven to 100° C. during 7 minutes and then dropped into fine paraffin powder (<180 μm). The layer of paraffin powder was maintained at 15° C. in order to avoid any agglomeration of the powder. The paraffin-coated diamonds were retrieved using a 300 mesh sieve. The paraffin-coated diamonds were then dropped from a (not heated) vibrating table into the layer of silicon carbide particles and sprayed with methanol before further silicon carbide particles were added to completely cover the paraffin-coated diamonds. All particles were thereafter collected in a graphite mould and heated in a standard oven set to 45° C. during 10 minutes. Immediately after the heating, the particles were subjected to a pressure of 50 kg/cm². After cooling the batch to 10° C., the particles were very gently sieved and the aggregate particles retrieved.

EXAMPLE 2

In this example, 300 ct of MBS 970 −30/+40 mesh diamonds were heated during 7 minutes to 200° C. and separately dropped from a heated vibrating table onto a layer of fine QPAC™ Poly(Akylene Carbonate) Copolymer (particle size below 250 μm), which was maintained at 10° C. The binder-coated diamonds were retrieved by sieving and put on a vibrating table at 10° C., from which they were dropped into a layer of fused tungsten carbide particles with particle sizes from 45 to 150 μm and sprayed with methanol before they were covered with a second layer of the fused tungsten carbide particles. The particles were then heated to 100° C. during 10 minutes in a tunnel furnace and, immediately thereafter, subjected to a pressure of 100 kg/cm². After the particles had cooled to 10° C., the aggregate particles were retrieved using a 355 mesh size sieve.

The aggregate particles were put into a rotary drum and coated with a particulate mass containing 38 μm-size CuTiSn prealloyed powder (78.5% Cu, 8% Ti and 13.5% Sn). The quantity of prealloyed powder was chosen to correspond to 50% by volume of the tungsten carbide content of the aggregate particles. The coated aggregate particles were then coated with fine KEEN™ 10 powder Prealloyed Powder (co-precipitate of Cu—Fe—Co available from Eurotungstene) to arrive at a diamond concentration of 9% by volume.

The granules were cold-pressed into the shape of diamond segments for cutting wheels and sintered in graphite molds at 900° C. and a pressure of 250 kg/cm². The analysis of the diamond segments revealed that under the indicated temperature and pressure conditions, the liquid phase of CuTiSn had infiltrated into the aggregate particle (core diamond and surrounding fused WC particles), thus anchoring the core diamond and the fused WC particles by metal-carbon bonds.

EXAMPLE 3

300 ct of MBS 970 −25/+35 mesh diamonds were heated during 7 minutes to 250° C. and dispersed on a vibrating table in an atmosphere at 200° C. The diamonds were separately dropped onto a layer of polyvinyl butyral (Mowital™ B16H polyvinyl butyral) (particle size below 250 μm). The binder-coated diamonds were retrieved by sieving and put on a vibrating table at ambient temperature (about 20° C.), from which they were dropped into a layer of MBS 960 −40/+50 mesh diamonds and sprayed with methanol before they were covered with a second layer of MBS 960 −40/+50 mesh diamonds. The particles were then heated to 150° C. during 10 minutes in a steel mould and subjected to a pressure of 100 kg/cm². After the particles had cooled to ambient temperature, the aggregate particles were retrieved using a sieve with 850 μm mesh size. The aggregate particles were then coated first with a thin layer of detonation-origin nanodiamonds, then with 3-μm-sized Si particles, using conventional binder (e.g. glycerine, glycerol formal, cellulose, Methocel™ or the like). The mass of Si particles was calculated to amount to between 10 and 12% by weight of the diamonds contained in the aggregates. The so-obtained granules were placed in capsules for a HPHT press and surrounded by pure graphite powder. The granules were heated to 700° C. during 45 minutes under in argon atmosphere to almost completely eliminate the binder.

The capsules were then carefully introduced into an HPHT press and subjected to pressure of 5.5 GPa at 1400° C. for 5 minutes. During this step, the Si particles liquefy, infiltrate the aggregate particle composed of the core diamond and the smaller peripheral diamonds, and form SiC bonds with the surrounding diamonds. The so-obtained composite particles are stable up to temperatures of about 1200° C. and extremely resistant to erosion.

Using the method disclosed in WO 2008/025836 A1, the composite particles were coated with a particulate mass containing a mixture of sinterable powder (60% Co and 40% WC) to yield a diamond concentration of 25% by volume. The granules were then hot-pressed at 350 kg/cm² and 1000° C. in the shape of inserts. These were then welded onto a drill bit for oil drilling operation.

For the reader's convenience, the following table allows converting the ASTM mesh sizes into approximate particle diameters:

| Mesh size | Diameter (μm) |
|---|---|
| 14 | 1400 |
| 16 | 1180 |
| 18 | 1000 |
| 20 | 850 |
| 25 | 710 |
| 30 | 600 |
| 25 | 500 |
| 40 | 425 |
| 45 | 355 |
| 50 | 300 |
| 60 | 250 |
| 70 | 212 |
| 80 | 180 |
| 100 | 150 |
| 120 | 125 |
| 140 | 106 |
| 170 | 90 |
| 200 | 75 |
| 230 | 63 |
| 270 | 53 |
| 325 | 45 |
| 400 | 38 |

While specific embodiments and examples have been described in detail, those with ordinary skill in the art will appreciate that various modifications and alternatives to those details could be developed in the light of the overall teaching of the disclosure. Accordingly, the particular arrangements disclosed are meant to be illustrative only and not limiting as to the scope of the invention, which is to be given the full breadth of the appended claims and any and all equivalents thereof.

The invention claimed is:

1. A method of forming aggregate abrasive grains for use in production of abrading or cutting tools, each of said aggregate abrasive grains comprising an abrasive core particle and a plurality of abrasive peripheral particles disposed around the core particle, said method comprising: providing first particles intended to become said core particles with a coating comprising a binder to form individual binder-coated first particles; at a temperature lower than the melting point of said binder such that the coating is in solid state, surrounding said binder-coated first particles with second particles intended to become said peripheral particles, wherein surrounding said binder-coated first particles with said second particles comprises placing or dropping said binder-coated first particles on a layer of said second particles and covering the placed or dropped binder-coated first particles with further second particles; heating said binder-coated first particles surrounded with said second particles to a temperature sufficient to soften the binder thereby softening the binder of said coating and causing said second particles to attach to said first particles and to form said aggregate abrasive grains.

2. The method as claimed in claim 1, wherein said first particles are provided with a coating comprising said binder by dropping said first particles onto a binder in powder form, said first particles having a temperature above said melting temperature of said binder when being dropped to cause binder getting into contact with said first particles to melt and to coat said core first particles.

3. The method as claimed in claim 2, wherein said first particles dropped into said binder are covered with more of said binder immediately after said dropping.

4. The method according to claim 1, wherein said coating is essentially free of solvent for said binder.

5. The method according to claim 1, wherein said coating is a shell of sinterable particulate mass containing said binder.

6. The method as claimed in claim 1, wherein pressure is applied to said binder-coated first particles surrounded with said peripheral particles during said heating or after said heating such that the peripheral particles are configured to be pushed into the binder.

7. The method as claimed in claim 1, wherein said binder comprises a thermoplastic and/or a synthetic resin and/or paraffin.

8. The method as claimed in claim 1, wherein at least one of said first particles and second particles comprise tungsten carbide particles or superabrasive particles including natural or synthetic, CVD-coated, diamonds, or boron nitride particles, or boron carbide particles.

9. The method as claimed in claim 1, wherein each of said first particles that are provided with a coating comprising said binder comprises a superabrasive particle that is individually encrusted within a coating of presintered material or individually coated with a shell of sinterable particulate mass.

10. The method as claimed in claim 1, comprising wetting said placed or dropped binder-coated first particles, by spraying on said binder-coated first particles a liquid, prior to covering them with further second particles.

11. The method as claimed in claim 1, comprising coating said aggregate abrasive grains with a sinterable particulate mass.

12. The method as claimed in claim 11, wherein said first particles and said second particles are diamond particles, and wherein said sinterable particulate mass comprises carbonaceous particles, said sinterable particulate mass optionally further comprising metal or metalloid particles.

13. A method of forming aggregate abrasive grains for use in production of abrading or cutting tools, each of said aggregate abrasive grains comprising a single abrasive core particle and a plurality of abrasive peripheral particles disposed around the core particle, said method comprising:
providing first particles intended to become said core particles;
providing a binder in powder form, wherein the binder is at a temperature lower than its melting point;
dropping said first particles onto the binder in powder form, wherein said first particles are at a temperature above the melting temperature of said binder, thereby causing the binder getting into contact with said first particles to melt and to form a coating around said first particles;
surrounding said binder-coated first particles with second particles intended to become said peripheral particles;
heating said binder-coated first particles surrounded with said second particles to a temperature sufficient to soften the binder thereby softening the binder and causing the second particles to attach to said binder-coated first particles and to form said aggregate abrasive grains.

14. The method as claimed in claim 13, wherein surrounding said binder-coated first particles with said second particles comprises placing or dropping said binder-coated first particles on a layer of said second particles and covering the placed or dropped binder-coated first particles with further second particles.

15. The method according to claim 13, wherein said coating is essentially free of solvent for said binder.

16. The method as claimed in claim 13, wherein pressure is applied to said binder-coated first particles surrounded with said peripheral particles during said heating or after said heating such that the peripheral particles are configured to be pushed into the binder.

17. The method as claimed in claim 13, wherein said binder comprises a thermoplastic and/or a synthetic resin and/or paraffin.

18. The method as claimed in claim 13, wherein at least one of said first particles and second particles comprise tungsten carbide particles or superabrasive particles including natural or synthetic, CVD-coated, diamond, or boron nitride particles, or boron carbide particles.

19. The method as claimed in claim 13, wherein said first particles dropped into said binder are covered with more of said binder immediately after said dropping.

20. The method as claimed in claim 13, comprising coating said aggregate abrasive grains with a sinterable particulate mass.

21. A method of forming aggregate abrasive grains for use in production of abrading or cutting tools, each of said aggregate abrasive grains comprising an abrasive core particle and a plurality of abrasive peripheral particles disposed around the core particle, said method comprising:
providing superabrasive particles, which are each individually encrusted within a coating of presintered material or individually coated with a shell of sinterable particulate mass, as first particles intended to become said core particles
coating said first particles with a binder to form individual binder-coated first particles;
at a temperature lower than the melting point of said binder such that the coating is in solid state, surrounding said binder-coated first particles with second particles intended to become said peripheral particles;
softening said binder by heating said binder-coated first particles surrounded with said second particles to a temperature sufficient to soften the binder, thus forming said aggregate abrasive grains as said second particles attach to said first particles.

22. The method according to claim 21, wherein said coating is essentially free of solvent for said binder.

23. The method as claimed in claim 21, wherein pressure is applied to said binder-coated first particles surrounded with said peripheral particles during said heating or after said heating such that the peripheral particles are configured to be pushed into the binder.

24. The method as claimed in claim 21, wherein said binder comprises a thermoplastic and/or a synthetic resin and/or paraffin.

25. The method as claimed in claim 21, wherein at least one of said first particles and second particles comprise tungsten carbide particles or superabrasive particles including natural or synthetic, CVD-coated, diamond, or boron nitride particles, or boron carbide particles.

26. The method as claimed in claim 21, comprising coating said aggregate abrasive grains with a sinterable particulate mass.

* * * * *